Jan. 15, 1963
L. R. GRABOWSKI
3,073,177
STOP MECHANISM FOR A BALL NUT AND SCREW ASSEMBLY
Filed Oct. 27, 1960
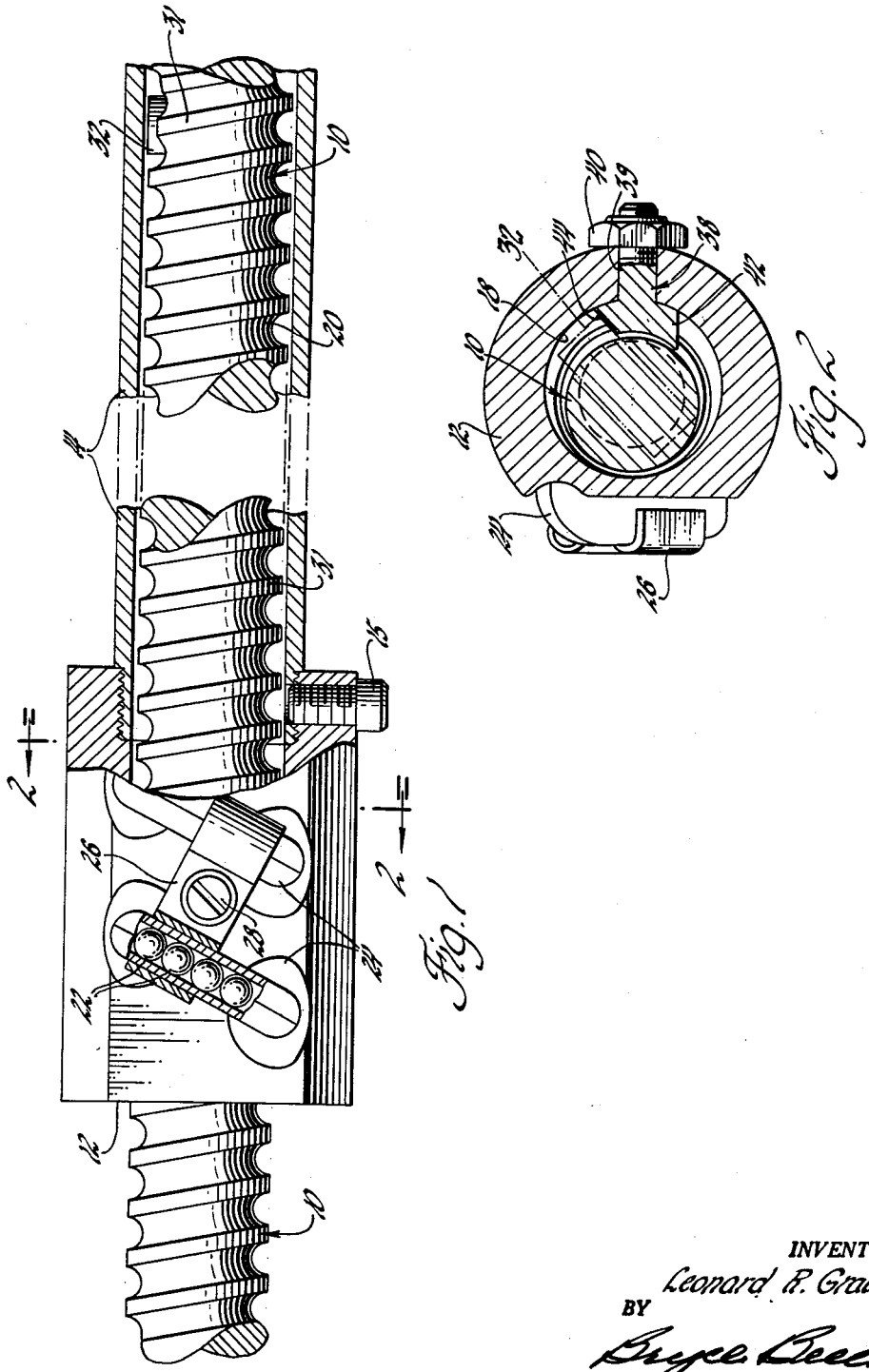
INVENTOR.
Leonard R. Grabowski
BY
ATTORNEY

United States Patent Office 3,073,177
Patented Jan. 15, 1963

---

3,073,177
STOP MECHANISM FOR A BALL NUT AND SCREW ASSEMBLY
Leonard R. Grabowski, Bay City, Mich., assignor to General Motors Corporation, Detroit, Mich., a corporation of Delaware
Filed Oct. 27, 1960, Ser. No. 65,517
3 Claims. (Cl. 74—459)

This invention relates to a stop mechanism for arresting relative lineal movement between a screw and a ball nut carried on the screw.

Ball nut and screw devices find wide application as components of actuators and similar instrumentalities. In some cases, it is required that the nut carry a tubular adaptor or the like extending coaxially of and enveloping the screw. With this condition, arrestment of the lineal movement of the nut relative to the screw or vice versa cannot be provided for as in other cases by the simple expedient of equipping the body of the nut with an end abutment adapted to be engaged by a radial projection on the screw.

Heretofore in these cases the stop mechanism has taken the form of a pin embedded in the helical groove of the screw and a similar pin fixed in the helical groove of the nut in a location precluding interference with the ball travel. In use of this scheme, however, it has been found where the loads involved are high that one or both of such pins may bend with failure of the stop mechanism.

As suggested, the principal object of the present invention is to provide a stop mechanism for the indicated purpose which is capable of withstanding substantially higher loads than the mechanism just described.

Other objects of the invention will be apparent from the following description going to a preferred embodiment thereof. The description will proceed with reference to the accompanying drawings wherein:

FIGURE 1 is a side elevation with certain parts shown in section or broken away; and FIGURE 2 is a section on the line 2—2 in FIGURE 1, with one of the stop elements shown in phantom lines.

Referring to the drawings, the numeral 10 denotes the screw component of the device. Carried thereon is a ball nut 12 mounting a tubular adaptor 14. This adaptor, which is threaded to the nut and secured by a screw 15, may be considered as extending to a part actuated by the nut as the same is caused to travel lineally on the screw by clockwise rotation of the latter.

The helical groove 18 formed internally of the nut 12 conforms with the helical groove 20 of the screw. These two grooves together form a race for the balls 22 providing the connection between the nut and screw. In the particular design, there are two ball circuits as evidenced by the two return tubes 24 secured to the body of the nut by a clamp member 26. The latter is itself fastened to the nut by means of screw 28.

It will be understood that lineal travel of the nut on the screw is marked by rolling movement of the balls in their paths set by the helical race and the return tubes. Rotation of the nut with the screw is prevented by the connection between the actuator 14 and the part, not shown, displaced thereby.

Screw 10 will be seen as carrying a pin 32 having a press fit in the screw and a diameter such that it extends into the groove of the screw while receiving the support of the helical land 31, i.e., the support of the full diameter of the screw. This pin sets the limit of movement of the ball nut and is located as determined by the requirements of the particular system.

As the counterpart of the pin 32, a generally T-shaped stop element 38 is employed, the same being fixed to the nut 12 by means of a lock nut 40 threaded on the radially extending portion 39. The portion 39 is shown integral with portion 42 disposed in the helical groove 18 of the nut 12 and shaped in correspondence with the groove. Such portion 42 is located outward of the right hand ball circuit and, hence, can in no way interfere with the movement of the balls. One end thereof will be seen tapered (44), the tapered area providing the stop surface.

It should be apparent that upon engagement of the surface 44 with the pin 32 the load force does not tend to bend the portion 42, as would be the case with a simple pin, but tends, rather, to shear such portion from the portion 39 along the line of juncture of the two portions. Using such a stop, operating in shear, the load bearing capacity of the stop mechanism is greatly increased and especially if the pin top (32) carried by the screw extends across the helical land of the screw as shown. It will be recognized that the pin used heretofore in the location of the T-stop could not be made to a diameter exceeding the width of the helical groove of the ball nut because of interference with the helical land 31.

I claim:

1. Mechanism for arresting relative lineal movement between a screw and a ball nut carried thereon, said mechanism comprising stop means extending radially of the axis of the screw, and a generally T-shaped stop element carried by said nut, the cross portion of said element being shaped in general correspondence with the groove of the nut and being bottomed in such groove, the leg portion thereof extending radially through the body of the nut and being fixedly secured thereto.

2. Mechanism for arresting relative lineal movement between a screw and a ball nut carried thereon, said mechanism comprising stop means extending radially of the screw and so dimensioned in the direction axial of the screw as to extend into the groove of the screw while receiving the support of the helical land thereof, and a generally T-shaped stop element carried by said nut, the cross portion of said element being shaped in general correspondence with the groove of the nut and being bottomed in such groove, the leg portion of said element extending radially through the body of the nut and being fixedly secured thereto.

3. Mechanism according to claim 2 where said stop means has the form of a pin fitted into said screw and where the end of the cross portion of said element engaged by said pin is tapered so as to increase the area of its contact with the pin.

References Cited in the file of this patent

UNITED STATES PATENTS

| | | |
|---|---|---|
| 2,446,393 | Russell | Aug. 3, 1948 |
| 2,636,397 | Jacubenta | Apr. 28, 1953 |
| 2,844,969 | Lohr | July 29, 1958 |
| 2,944,436 | Pickles | July 12, 1960 |